US012667946B2

(12) United States Patent
Chen et al.

(10) Patent No.: US 12,667,946 B2
(45) Date of Patent: Jun. 30, 2026

(54) FAUCET TOOL WITH ILLUMINATION FEATURE

(71) Applicant: JS Products Inc., Las Vegas, NV (US)

(72) Inventors: Chungeng Chen, Las Vegas, NV (US); James Stobar, Las Vegas, NV (US)

(73) Assignee: JS Products, Inc., Las Vegas, NV (US)

( * ) Notice: Subject to any disclaimer, the term of this patent is extended or adjusted under 35 U.S.C. 154(b) by 314 days.

(21) Appl. No.: 18/222,334

(22) Filed: Jul. 14, 2023

(65) Prior Publication Data

US 2024/0017385 A1 Jan. 18, 2024

Related U.S. Application Data

(60) Provisional application No. 63/368,723, filed on Jul. 18, 2022.

(51) Int. Cl.

*B25B 23/18* (2006.01)
*A45F 5/02* (2006.01)
*B25B 13/48* (2006.01)
*A45F 5/00* (2006.01)
*B25B 13/50* (2006.01)

(52) U.S. Cl.

CPC .............. *B25B 23/18* (2013.01); *A45F 5/021* (2013.01); *B25B 13/481* (2013.01); *A45F 2005/002* (2013.01); *A45F 5/1575* (2025.01); *B25B 13/5091* (2013.01)

(58) Field of Classification Search

CPC ....... B25B 13/04; B25B 13/06; B25B 13/065; B25B 13/107; B25B 13/48; B25B 13/481; B25B 13/50; B25B 13/5091; B25B 13/58; B25B 23/0035; B25B 23/18; A45F 5/021; A45F 5/1575; A45F 2005/002; E03C 1/02

See application file for complete search history.

(56) References Cited

U.S. PATENT DOCUMENTS

| | | | | |
|---|---|---|---|---|
| 4,749,251 A | | 6/1988 | Moulin | |
| 5,031,981 A | | 7/1991 | Peterson | |
| 5,158,356 A | * | 10/1992 | Guthrie | F21L 4/005 362/198 |
| 5,542,321 A | | 8/1996 | Fuca | |
| 5,572,912 A | | 11/1996 | Gasparre | |
| 5,893,631 A | * | 4/1999 | Padden | F21L 2/00 362/119 |
| 6,474,201 B1 | | 11/2002 | Lund | |
| 6,701,807 B1 | | 3/2004 | Gammon | |

(Continued)

FOREIGN PATENT DOCUMENTS

| | | |
|---|---|---|
| CN | 206663078 | 11/2017 |
| CN | 209095426 | 7/2019 |

(Continued)

*Primary Examiner* — Robert J Scruggs
(74) *Attorney, Agent, or Firm* — Snell & Wilmer LLP

(57) ABSTRACT

A clip apparatus is provided for use with a faucet tool. The faucet tool has an elongated body. The clip apparatus includes a biasing member structured to be coupled to and flex with respect to the elongated body, a light emitting component coupled to the biasing member, a power source located internal with respect to the biasing member and configured to energize the light emitting component, and a button mechanism coupled to the biasing member and configured to activate the power source in order to energize the light emitting component.

18 Claims, 6 Drawing Sheets

(56) References Cited

U.S. PATENT DOCUMENTS

| | | | | |
|---|---|---|---|---|
| 6,817,272 | B2 | 11/2004 | Holland | |
| 6,938,522 | B1 | 9/2005 | Stannik | |
| 7,080,581 | B2 | 7/2006 | Reese | |
| 7,172,309 | B2 * | 2/2007 | Parsons | A44B 15/005 362/116 |
| D560,986 | S | 2/2008 | Adkins et al. | |
| 7,347,129 | B1 | 3/2008 | Youtsey | |
| D698,219 | S | 1/2014 | Lee | |
| 9,511,482 | B2 | 12/2016 | Stonefield | |
| D892,592 | S | 8/2020 | Patil et al. | |
| 10,946,501 | B2 | 3/2021 | Patil et al. | |
| 2004/0194585 | A1 | 10/2004 | Clark | |
| 2005/0199103 | A1 | 9/2005 | Thompson | |
| 2008/0034927 | A1 | 2/2008 | Adkins et al. | |
| 2008/0066584 | A1 | 3/2008 | Vines | |
| 2008/0087145 | A1 | 4/2008 | Youtsey | |
| 2008/0098858 | A1 | 5/2008 | Thomas | |
| 2008/0278936 | A1 * | 11/2008 | Kurth | F21L 4/027 362/191 |
| 2009/0178517 | A1 | 7/2009 | Forrester | |
| 2009/0190339 | A1 * | 7/2009 | Galli | F41G 11/003 362/205 |
| 2013/0192039 | A1 | 8/2013 | Trusty | |
| 2017/0157749 | A1 | 6/2017 | Levy | |
| 2017/0232587 | A1 | 8/2017 | Tommaso | |
| 2018/0056489 | A1 * | 3/2018 | Patil | B25B 23/0028 |
| 2018/0079058 | A1 | 3/2018 | Humphries | |
| 2021/0220973 | A1 | 7/2021 | Patil et al. | |

FOREIGN PATENT DOCUMENTS

| | | |
|---|---|---|
| CN | 209774492 | 12/2019 |
| DE | 102017206237 | 12/2021 |
| GB | 2457514 | 8/2009 |
| KR | 10-2006-0063220 | 6/2006 |
| KR | 10-1089842 | 12/2011 |
| KR | 10-2018-0064356 | 6/2018 |

* cited by examiner

FAUCET TOOL WITH ILLUMINATION FEATURE

RELATED APPLICATION DATA

The present invention claims priority to U.S. Provisional Application Ser. No. 63/368,723, filed Jul. 18, 2022, which application is incorporated herein by reference in its entirety.

FIELD OF THE INVENTION

The present invention relates to faucet tools, and in particular to faucet tools with illumination features. The present invention also relates to clip apparatuses for faucet tools.

BACKGROUND OF THE INVENTION

Nuts used to secure kitchen faucets, spray hoses, toilet ballcocks and the like usually are difficult to engage with a wrench. In recent years, plastic nuts have been used to secure faucets, ballcocks and the like. Many plastic nuts have wings or flanges to facilitate turning of the nuts by hand. In many cases, however, it still is necessary to use a wrench with such nuts to insure tightness and also to loosen nuts which may have become "frozen" in place either through over-tightening or as a result of minerals in the water. Furthermore, many nuts are commonly located in difficult to access places, places that may be dark. There is thus a need for an improved faucet tool which will allow users to install and remove nuts while being able to see in these relatively dark locations. It is with respect to these and other considerations that the instant disclosure is concerned.

SUMMARY OF THE INVENTION

As one aspect of the invention, a clip apparatus is provided for use with a faucet tool. The faucet tool has an elongated body. The clip apparatus includes a biasing member structured to be coupled to and flex with respect to the elongated body, a light emitting component coupled to the biasing member, a power source located internal with respect to the biasing member and configured to energize the light emitting component, and a button mechanism coupled to the biasing member and configured to activate the power source in order to energize the light emitting component.

As another aspect of the invention, a faucet tool including an elongated body, a first tool member and a second tool member each coupled to the body, and the aforementioned clip apparatus is provided.

Further objects, features, and advantages of the present invention over the prior art will become apparent from the detailed description of the drawings which follows, when considered with the attached figures.

DETAILED DESCRIPTION OF THE INVENTION

Figure 1:
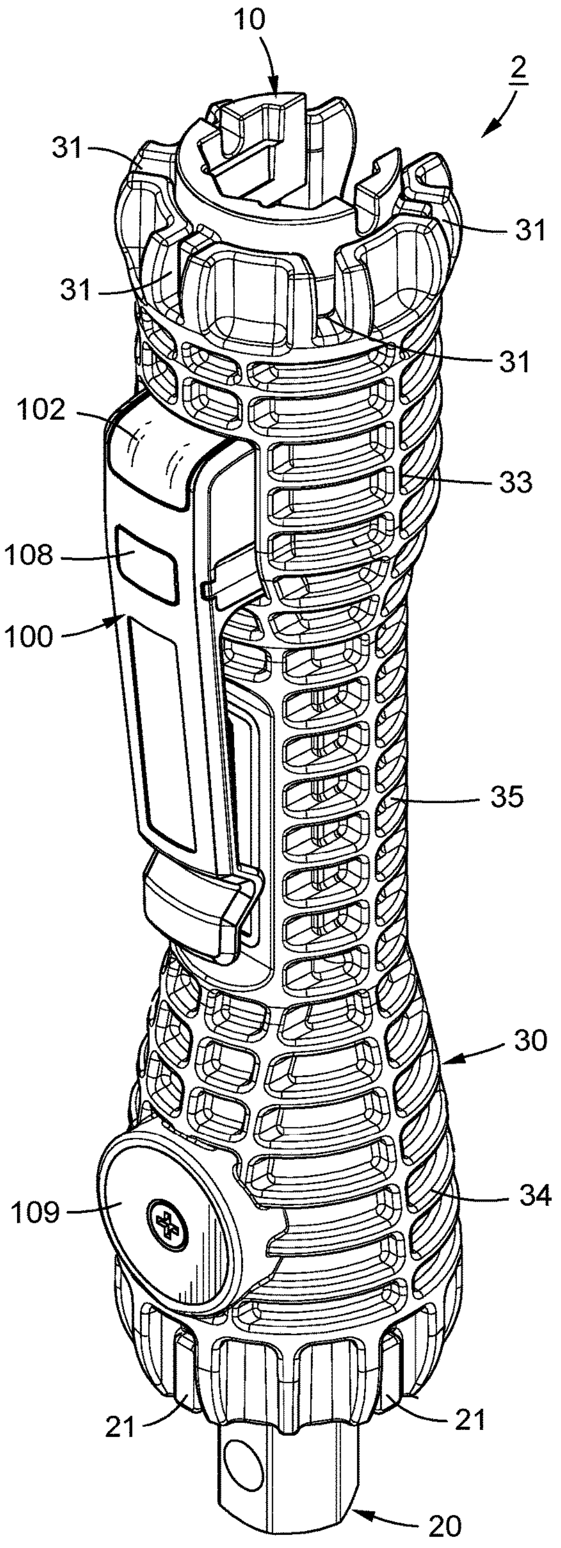
FIGS. 1 and 2 are front and rear isometric views, respectively, of a faucet tool, in accordance with one non-limiting embodiment of the disclosed concept.
Figure 2:
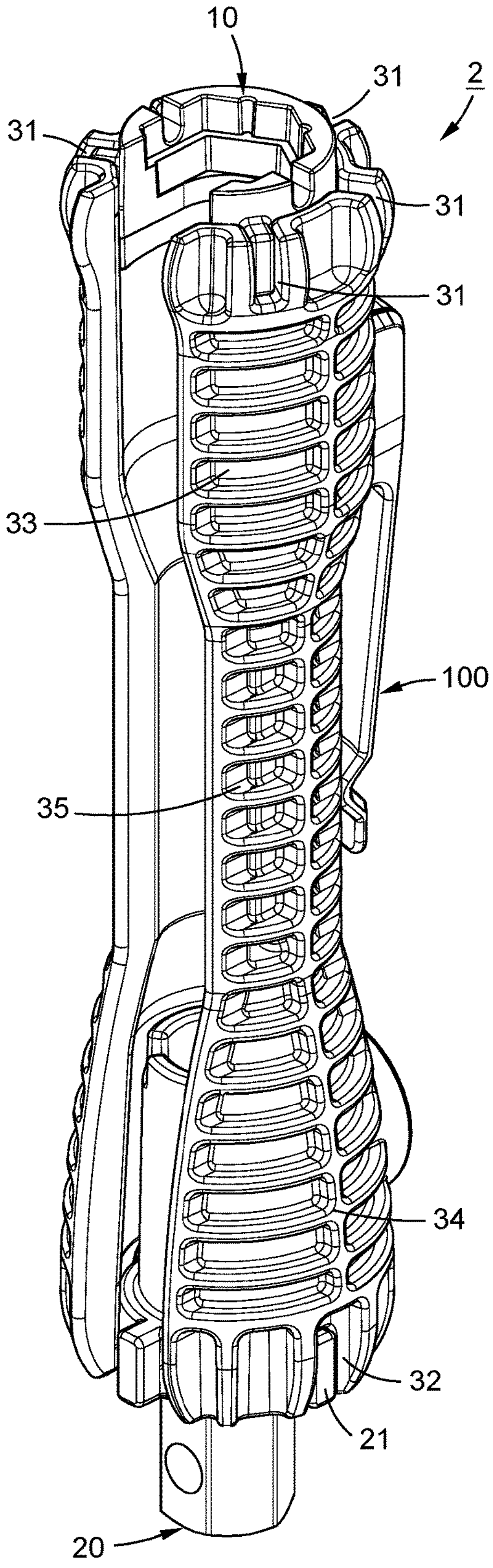
Figure 3:
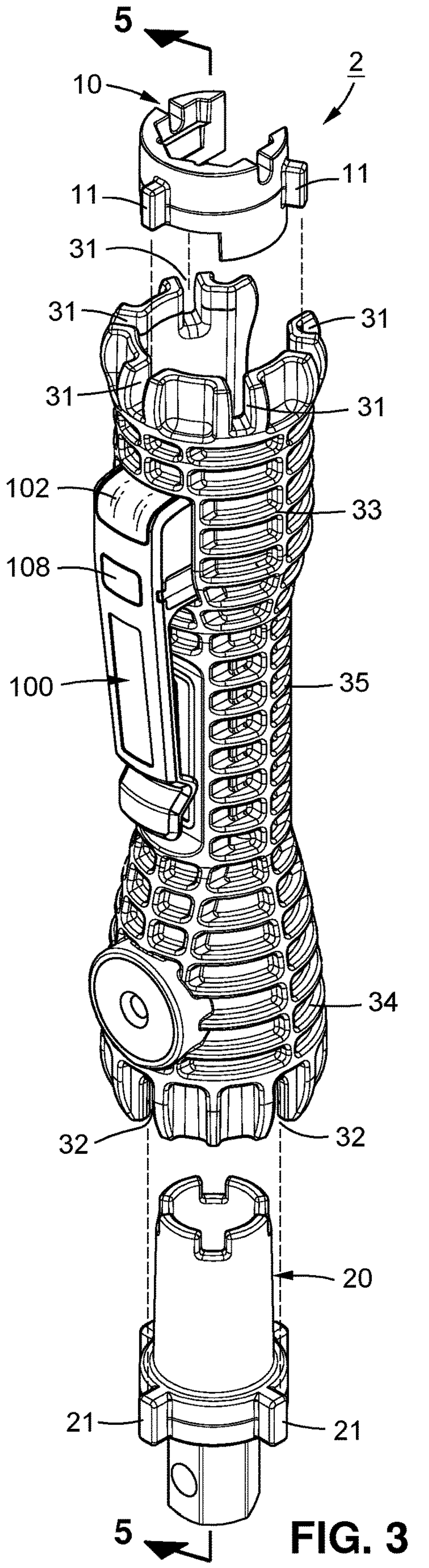
FIGS. 3 and 4 are front and rear exploded isometric views, respectively, of the faucet tool of FIGS. 1 and 2.
Figure 4:
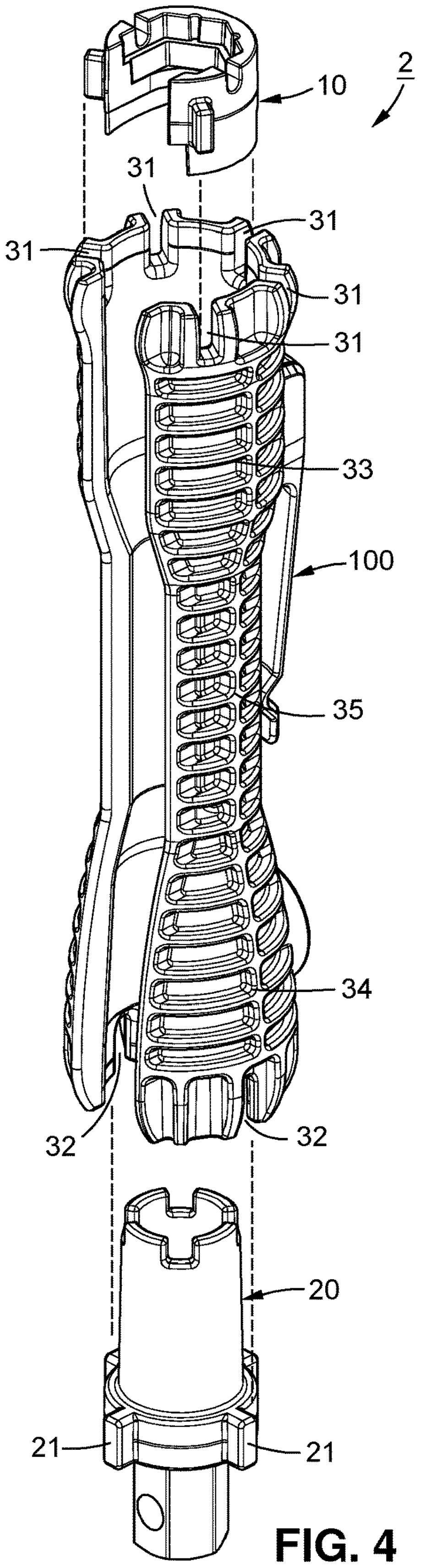
Figure 5:
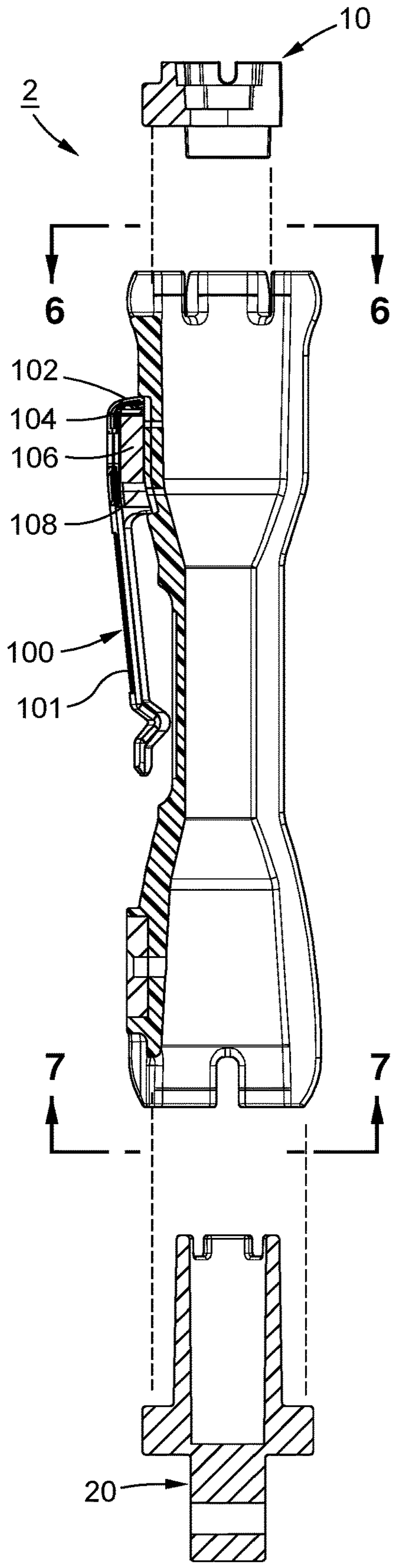
FIG. 5 is a section view of the faucet tool of FIGS. 3 and 4.

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

One embodiment of the invention is a faucet tool 2, as shown in FIGS. 1-11. Faucet tool 2 may comprise a main body 30 and first and/or second tool member 10, 20 (FIGS. 12-19) which may be coupled thereto (such as, in one configuration, removably coupled to the body 30). The tool 2 may further comprise a clip apparatus 100, such as which is coupled to (such as removably coupled to) the body 30. Faucet tool 2 may be used to rotate basin nuts to attach a faucet unit to a countertop or remove it therefrom. Faucet tool 2 is also useful in many other applications, for example tightening supply line nuts, plastic wing supply nuts, and supply line shut-off valves. In the depicted embodiment, faucet tool 2 is made from a molded rigid plastic material; however, other materials can be used.

Figure 6:
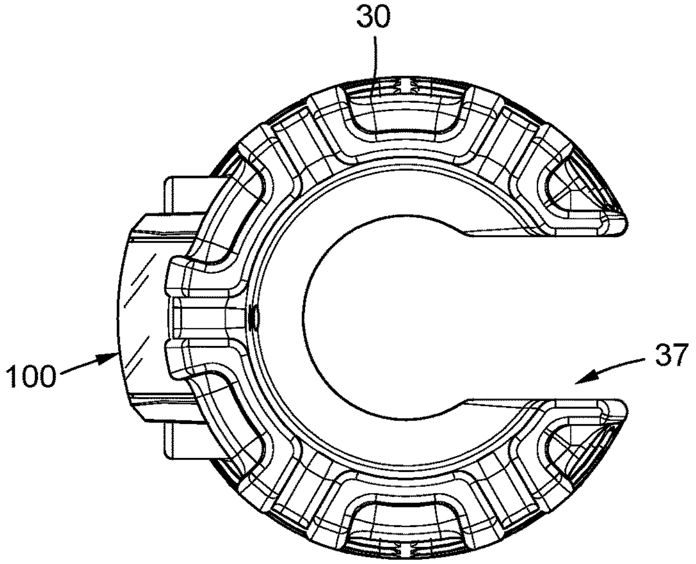
FIGS. 6 and 7 are top and bottom views, respectively, of the faucet tool of FIG. 5.
Figure 7:
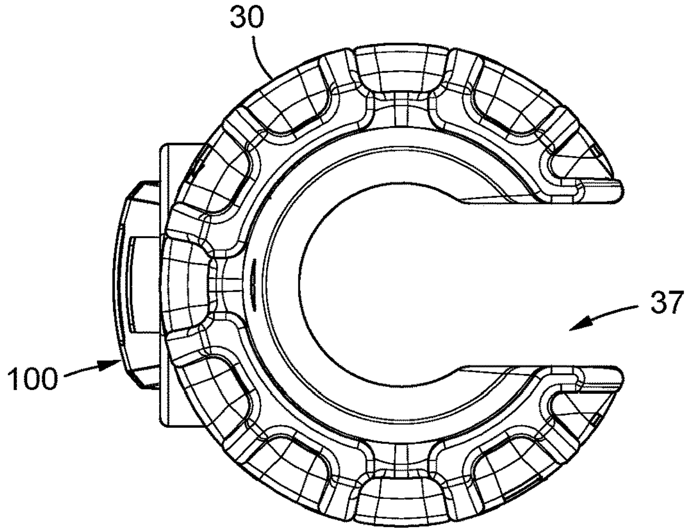

In one example embodiment, and as shown most clearly in FIGS. 6 and 7, body 30 may have a longitudinal hour-glass configuration that has first and second ends, and that is generally C-shaped in a cross section (e.g., has an open channel, e.g., slot 37 in FIGS. 6 and 7, extending longitudinally through one side) taken perpendicular to a longitudinal axis. The reason for the hour-glass configuration is so that the wider portions, e.g., portions 33, 34 of body 30, can allow for engagement with basin nuts and receipt of tool members 10, 20, while the narrow middle portion 35 can advantageously allow for easier gripping of faucet tool 2 in order to tighten or loosen basin nuts. The reason for the C-shaped configuration is so that a water supply line can be received through slot 37 (FIGS. 6 and 7) of body 30, and so that the supply line resides in the hollow interior portion of body 30 when faucet tool 2 is used to tighten or loosen a basin nut (or other component).

As shown in the FIGS., a plurality of circumferential ribs are formed on an exterior surface of body 30 to provide additional rigidity to body 30 while lessening the amount of material from which body 30 is made. The ribs can carry torsional forces that arise from tightening or loosening a nut, or similar component. The exterior ribs also limit the amount of surface area that can become soiled so that one's hand does not slip when one attempts to rotate faucet tool 2.

In the depicted embodiment, the tool members 10, 20 are adaptable to engage many different components including a basin nut, a water supply line nut, a water supply line shut-off valve and a strainer basket. A plurality of notches 31 extend generally parallel to the longitudinal axis of body 30 at the first end of the body 30 and another plurality of notches 32 extend generally parallel at the second end of the body 30. Notches 31, 32 are configured to engage basin nuts, and may be appropriately spaced about the circumference, i.e. angularly spaced from one another, so that the notches can engage two-winged nuts, three-winged nuts, four-winged nuts, and six-winged nuts depending on which end of the faucet tool is used to engage the basin nut. Additionally, tool members 10, 20 each have a plurality of protrusions 11, 21 configured to nest within corresponding notches 31, 32 in order to allow tool members 10, 20 to be coupled to body 30 so as to be rotated with the body when a user turns the body 30.

First tool member 10 may be configured to engage hex supply line nuts, plastic wing supply line nuts, hex basin nuts, and oval handle supply line shut-off valves. First tool member 10 may be made of a rigid material, for example, metal and/or plastic, and includes a substantially C-shaped side wall from which protrusions 11 extend radially outward. When protrusions 11 are received in notches 31 of body 30, first tool member 10 is fixed so that it rotates with body 30 as one rotates faucet tool 2. It will be appreciated that the first tool member 10 can connect with body 30 in another manner that allows for rotation therewith.

Second tool member 20 may be configured to be received inside an opening of body 30, as discussed above, and also includes protrusions 21 that radiate from a periphery of a cylindrical portion. It will be appreciated that the protrusions 21 are configured to be received inside notches 32 of body 30. However, second tool member 20 can attach to body 30 in other manners. Additionally, second tool member 20 can also be used independently of faucet tool 2. In such an instance, second tool member 20 would be removed from body 30 and the axially extending protrusions 21 would be inserted into openings in a strainer basket. Furthermore, a conventional wrench or bar could be employed to rotate the second tool member 20, and in turn, the strainer basket.

As mentioned above, and in accordance with the disclosed concept, faucet tool 2 also includes clip apparatus 100, such as which is configured to engage another element—such as to permit the tool 2 to be attached or clipped onto a user's pants or belt, a workbelt, etc. Clip apparatus 100 is advantageously provided with an illumination feature in order to allow users to use the tool 2 in relatively dark areas. More specifically, and with reference to FIGS. 5 and 8, clip apparatus 100 includes a biasing member in the form of an elongated clip 101, a window 102, a light emitting component 104 (e.g., without limitation, light emitting diode, incandescent bulb, etc.), a power source (e.g., battery 106), and a button mechanism 108. Clip 101 is coupled to and is structured to flex with respect to body 30. Light emitting component 104 is coupled to clip 101, is located internally with respect to window 102, and is electrically connected to battery 106. Battery 106 is configured for energizing light emitting component 104, and is located internal with respect to clip 101. Button mechanism 108 is coupled to clip 101 and is employed for activating battery 106 (such as by actuating or activating a switch, such as between on and off positions). In one example, window 102 is coupled to clip 101 and is at least partially transparent in order to allow light from light emitting component 104 to pass therethrough. Suitable alternative clip apparatuses (not shown), however, may not have a window.

It will be appreciated that window 102, light emitting component 104, battery 106, and button mechanism 108 are configured with the rest of the body of clip apparatus to be one self-contained apparatus that may be separately coupled to body 30. For example, in one configuration, the clip apparatus 100 has a head portion, such as which may define an internal area and has a top and a bottom. The internal area may be a cavity in clip 100, and light emitting component 104 and battery 106 may be disposed internal and be encapsulated in such a cavity.

Accordingly, battery 106 (and any associated switch), light emitting component 104 and the like may be located in the internal portion of the head. The window 102 might be located at a front of the head portion and the button mechanism 108 may be located at the top of the head portion, such as to be accessible by a thumb of a user. In one example, button mechanism 108 extends through a wall of clip 101, thereby allowing a user to press button mechanism 108. Additionally, the power source (e.g., battery 106) may be located between button mechanism 108 and light emitting component 104, and light emitting component 104 may be located between battery 106 and window 102. In this manner, the illumination feature of clip apparatus 100 is relatively ergonomically designed so that clip apparatus 100 can properly couple to body 30 as well as to a user's pants or belt without hinderance.

However, it will be appreciated that other arrangements are contemplated. For example, and without limitation, a suitable alternative clip apparatus (not shown) may employ a button mechanism side by side with a power source, such that each of these components are directly below a light emitting component, when viewed from a front view. A suitable alternative faucet tool may also, for example, have a processor, memory, antenna, and/or other smart equipment disposed internal with respect to clip 101, in order to allow a user to energize light emitting component 104 other than by pressing button mechanism 108 (e.g., by speaking into a headset or mobile device).

Figure 8:
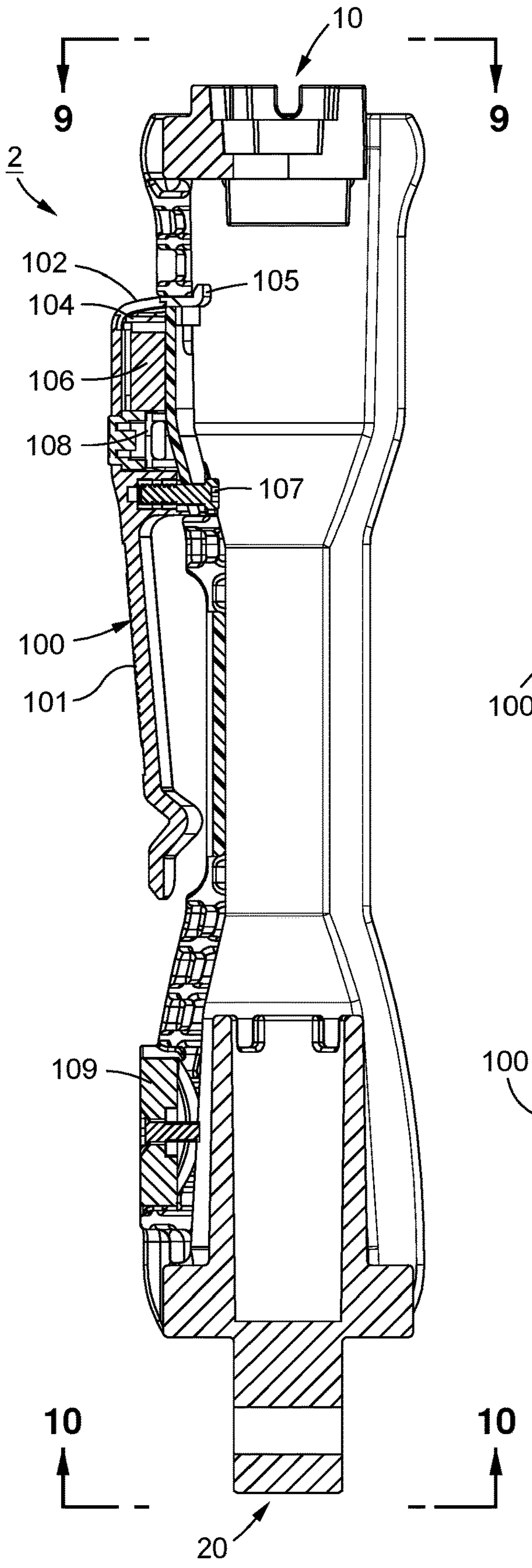
FIG. 8 is another section view of the faucet tool of FIGS. 6 and 7.
Figure 9:
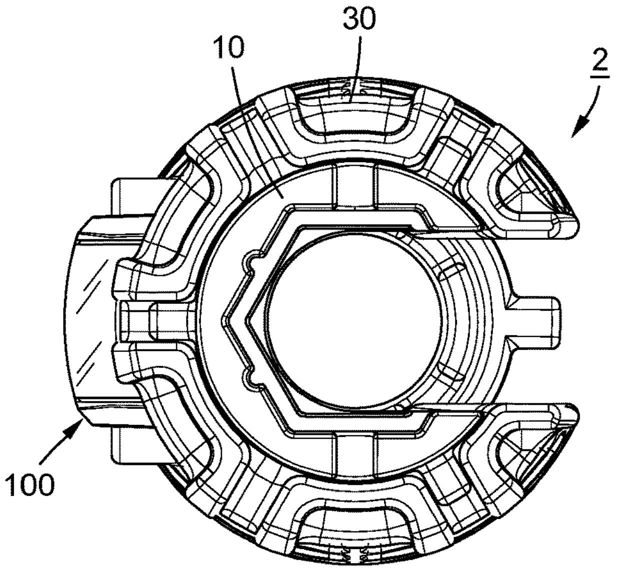
FIGS. 9 and 10 are additional top and bottom views of the faucet tool of FIG. 8.
Figure 10:
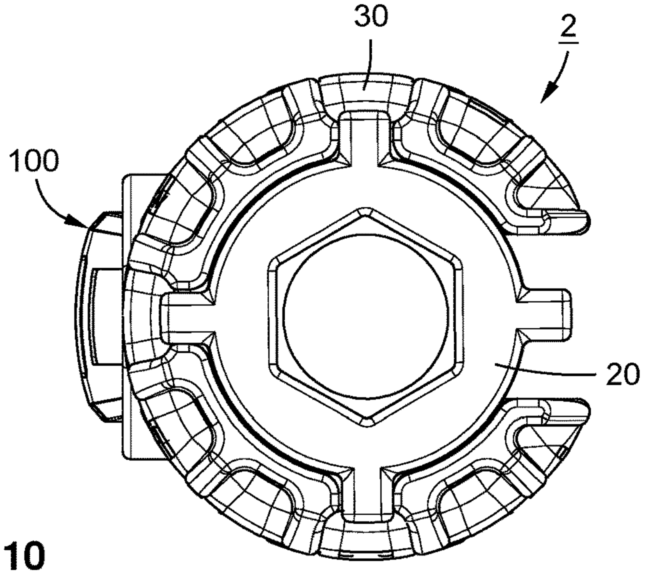
Figure 11:
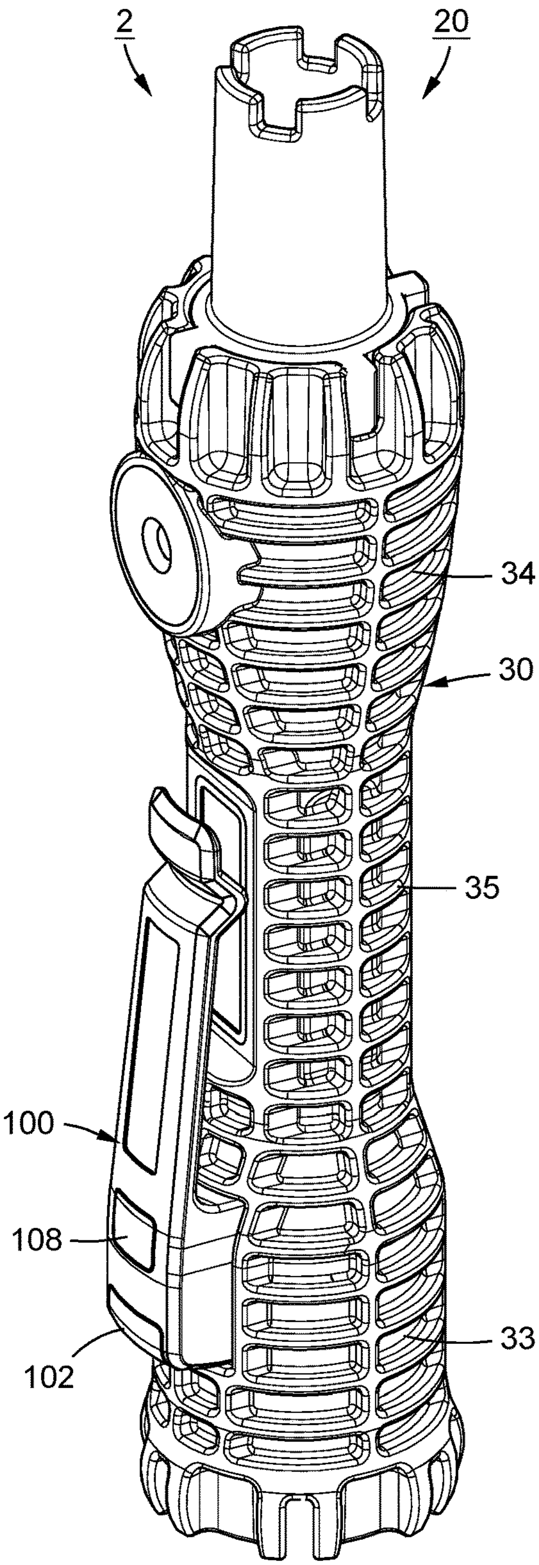
FIG. 11 is a bottom isometric view of the faucet tool of FIG. 8.
Figure 12:
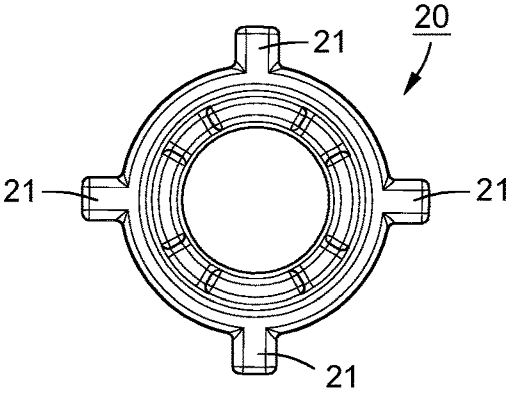
FIGS. 12-14 are top, front, and bottom views, respectively, of a tool member for the faucet tool of FIG. 8.
Figure 13:
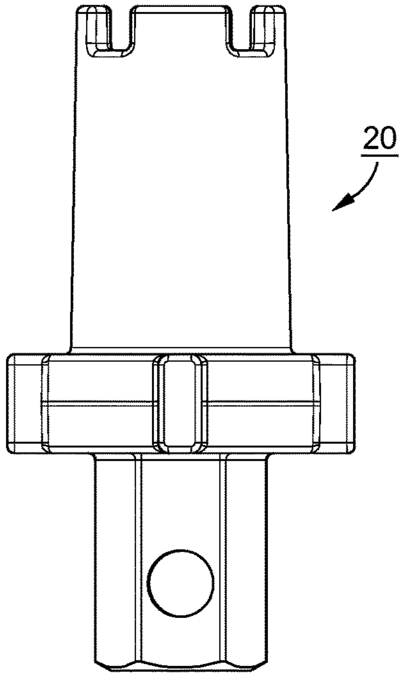
Figure 14:
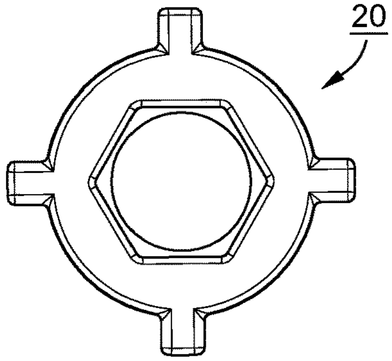
Figure 15:
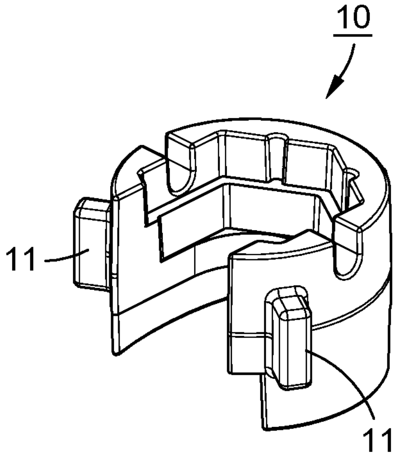
FIGS. 15-19 are front isometric, rear isometric, top, front, and bottom views, respectively, of another tool member for the faucet tool of FIG. 8.
Figure 16:
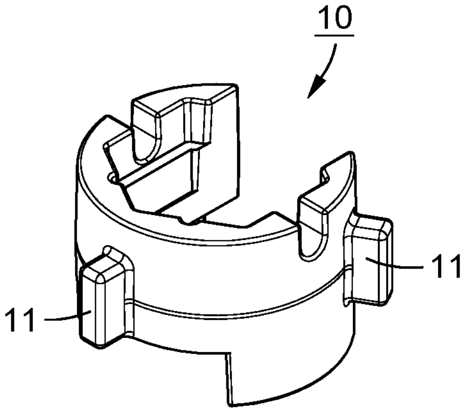
Figure 17:
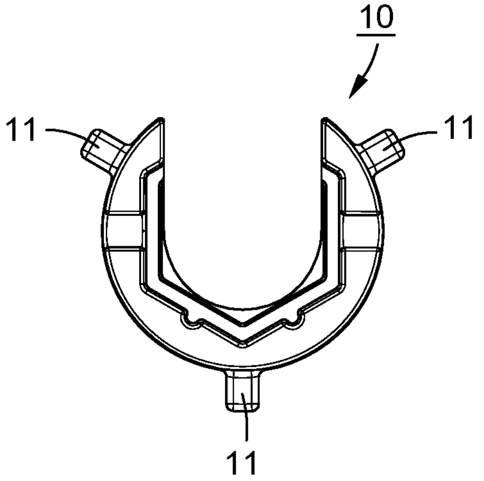
Figure 18:
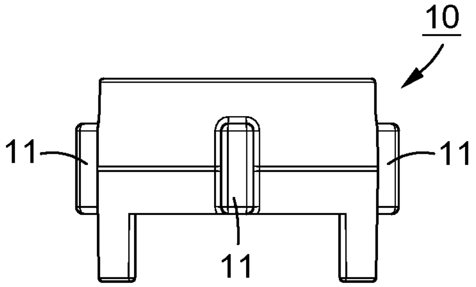
Figure 19:
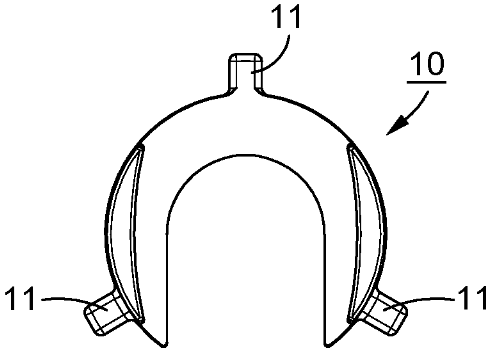

Moreover, the bottom of the head portion of clip apparatus 100 may be configured to engage the body 30 of the tool 2. For example, as illustrated in FIG. 8, clip 101 may include a first prong 105 at a first end thereof for coupling clip 101 to body 30 of faucet tool 2. This prong 105 may be configured to fit into or through an opening in the body 30 into the interior thereof. A fastener 107 may be passed through the body 30, such as also from the interior thereof, into engagement with the clip apparatus 100, such as at an opposite end of the head from the prong 105, thus locking the clip apparatus 100 to the body 30. This fastener 107 might comprise, for example, a threaded fastener. In this manner, clip apparatus 100 may be disconnectable from (e.g., be removably coupled to) body 30, such as by loosening the fastener 107 and rotating the clip apparatus 100 to a position where the prong 105 may be removed. Of course, clip apparatus 100 might be connected to the body 30 in other manners, such as by press-fitting into a recessed portion of the exterior thereof, by clipping, snapping or otherwise being connected thereto (in some in embodiments, clip apparatus 100 might be generally permanently mounted to the body 30, but in others, it may be removably connected).

Additionally, in one example clip 101 has a head portion (e.g., proximate prong 105) coupled to body 30 and a tail portion located opposite and distal the head portion. Moreover, light emitting component 104 may be located in the head portion of clip 101, and the tail portion may extend from the head portion and be spaced from body 30, as shown in FIG. 8. The tail portion may comprise a deformable body, such as which permits it to be moved away from the body 30 to permit a user's belt, pants or the like to fit between the leg and the body 30, where the leg generates a biasing force towards the body 30.

Referring again to FIG. 2, as shown, body 30 may have an open channel (e.g., slot 37 in FIGS. 6 and 7) on a side opposite clip apparatus 100, and the open channel may extend from a first end of body 30 longitudinally to an opposite end thereof. Body 30 may also have a longitudinal axis (e.g., an axis extending longitudinally through a central passage of body 30), and light emitting component 104 may be configured to emit light from an origin in a direction parallel to the longitudinal axis of body 30. In this manner, when a user is tightening or loosening a fastener with, for example, tool member 10 in FIG. 8, light will be shined directly and most intensely onto tool member 10, thereby improving the likelihood that the user will locate a given fastener and be able to tighten or loosen said fastener with faucet tool 2. Furthermore, if tool member 20 is desired, the user can switch tool members 10 and 20 in a simple manner, so that light shines onto tool member 20, accordingly.

Furthermore, in operation, when a user presses button 108, battery 106 is configured to energize light emitting component 104, thereby causing light to be emitted in an axial direction toward an end of faucet tool 2 proximate first tool member 10. It will thus be appreciated that if a user of faucet tool 2 is working on a component proximate first tool member 10, such as a wing nut, and that user needs to better see the component and the end of faucet tool 2, the user can simply press button mechanism 108 in order to cause light to advantageously be emitted on the work surfaces. In one embodiment, when the clip apparatus 100 is removably attached to the tool 30, the orientation of the clip apparatus 100 might be reversed (from that illustrated, for example, in FIG. 1) so that light is emitted towards the opposing end of the tool 2 (such as when the user is engaging a workpiece with the second end of the body 30 and/or the second tool member 20 attached thereto). In one configuration, reversal of the clip apparatus 100 might be facilitated by providing two mounts on the body 30, such as one near each end.

Of course, the clip apparatus 100 might be used with faucet tools 2 having other configurations, such having a different configuration of the body 30, tool members 10, 20, etc.

In some embodiments, the battery 106 may be removable, such as to be replaceable. In others, it might be rechargeable, such as where a charging port (such as for a USB cable or the like) might be provided (such as at a side of the clip).

As best illustrated in FIG. 1, the faucet tool 2 may include other features. For example, the tool 2 might include one or more magnets or other mounting or connection elements. For example, at least one magnet 109 may be associated with the body 30. As illustrated, the magnet 109 may be located in a recess in an outer portion of the body 30 so that a face or surface of the magnet 109 is exposed, such as for direct contact with a metal object to which the user wishes to connect the tool 2.

The invention has a number of advantages. One advantage of the invention is that an illumination element is associated with a faucet tool without jeopardizing the integrity of the body of the tool (as indicated above, the body 30 is configured to be rigid and have sufficient torsional strength to drive workpieces, directly or via tool members, and making portions of the body hollow or the like to accommodate light features may jeopardize that strength). Further, association of the illumination element with a clip allows the light to not only be directed parallel to the longitudinal axis of the tool 2, and thus towards a workpiece which is being engaged at an end thereof, but there the light is set off from the exterior of the body so as to not be blocked thereby.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A clip apparatus for use with a faucet tool, said faucet tool comprising an elongated body, said clip apparatus comprising:

- a head portion extending between a first end and a second end, said first end comprising a prong, said second end configured to receive a fastener;
- a biasing member extending from said second end of said head portion and structured to be coupled to and flex with respect to said elongated body;
- a light emitting component disposed internal with respect to said head portion;
- a power source disposed internal with respect to said head portion and configured to energize said light emitting component; and
- a button mechanism coupled to said head portion and configured to activate said power source in order to energize said light emitting component.

2. The clip apparatus according to claim 1, further comprising a window coupled to said biasing member and being at least partially transparent in order to allow light from said light emitting component to pass therethrough.

3. The clip apparatus according to claim 1, wherein said power source is a battery.

4. The clip apparatus according to claim 1, wherein said light emitting component is one of a light emitting diode or an incandescent bulb, and wherein said power source, said button mechanism, and said light emitting component are contained within said first end and said second end of said head portion.

5. The clip apparatus according to claim 4, wherein said light emitting component is said light emitting diode.

6. The clip apparatus according to claim 1, wherein said prong is configured for coupling said clip to said body of said faucet tool.

7. The clip apparatus according to claim 6, wherein said button mechanism extends through a wall of said clip.

8. The clip apparatus according to claim 7, wherein said button mechanism is disposed proximate said second end of said head, and further comprising a window coupled to said first end of said head and being at least partially transparent in order to allow light from said light emitting component to pass therethrough, wherein said power source is disposed between said button mechanism and said light emitting component, and wherein said light emitting component is disposed between said power source and said window.

9. A faucet tool comprising:

- an elongated body;
- a first tool member and a second tool member each coupled to the body; and
- a clip apparatus comprising:
  - a biasing member coupled to and structured to flex with respect to the body,
  - a light emitting component coupled to said biasing member,
  - a power source disposed internal with respect to said biasing member and configured to energize said light emitting component, and
  - a button mechanism coupled to said biasing member and configured to activate said power source in order to energize said light emitting component;

wherein the body of said faucet tool has a longitudinal axis, and wherein said light emitting component is configured to emit light from an origin in a direction parallel to the longitudinal axis; and wherein said biasing member is an elongated clip-having:

a head portion having a first end, a second end, a top, and a bottom, wherein the head portion is coupled to said body at a wider portion of said body, and a tail portion disposed distally from said head portion along said longitudinal axis, wherein said light emitting component is disposed in said head portion, and wherein said tail portion extends from said head portion, terminates proximate a narrow middle portion of said body, and is spaced from the body at said narrow middle portion.

10. The faucet tool according to claim 9, wherein the clip apparatus is a self-contained apparatus separately coupled to the body.

11. The faucet tool according to claim 9, wherein the body has an open channel on a side opposite said clip apparatus, and wherein said open channel extends from a first end of the body to an opposite end thereof.

12. The faucet tool according to claim 9, wherein said clip apparatus further comprises a window coupled to said biasing member and being at least partially transparent in order to allow light from said light emitting component to pass therethrough.

13. The faucet tool according to claim 9, wherein said power source is a battery.

14. The faucet tool according to claim 9, wherein said light emitting component is one of a light emitting diode or an incandescent bulb.

15. The faucet tool according to claim 14, wherein said light emitting component is said light emitting diode.

16. The faucet tool according to claim 9, wherein said button mechanism extends through a wall of said clip.

17. The faucet tool according to claim 16, wherein said clip apparatus further comprises a window coupled to said biasing member and being at least partially transparent in order to allow light from said light emitting component to pass therethrough, wherein said power source is disposed between said button mechanism and said light emitting component, and wherein said light emitting component is disposed between said power source and said window.

18. The faucet tool according to claim 9, wherein the head portion comprises a prong extending from the first end outwardly of the bottom and generally perpendicular to the biasing member.

* * * * *